(12) United States Patent
Wang et al.

(10) Patent No.: US 12,292,287 B2
(45) Date of Patent: May 6, 2025

(54) FIBER-OPTIC GYROSCOPE WITH A DUAL-INJECTION POLARIZATION-MAINTAINING 3X3 DIRECTIONAL COUPLER FOR ENHANCED MEASUREMENT SENSITIVITY THROUGH HETERODYNE

(71) Applicants: Chi-Luen Wang, Taipei (TW); Ju-Tah Tung, New Taipei (TW)

(72) Inventors: Chi-Luen Wang, Taipei (TW); Ju-Tah Tung, New Taipei (TW)

( * ) Notice: Subject to any disclaimer, the term of this patent is extended or adjusted under 35 U.S.C. 154(b) by 198 days.

(21) Appl. No.: 18/219,784

(22) Filed: Jul. 10, 2023

(65) Prior Publication Data

US 2023/0349696 A1 Nov. 2, 2023

Related U.S. Application Data

(63) Continuation-in-part of application No. 17/398,470, filed on Aug. 10, 2021, now abandoned.

(51) Int. Cl.
*G01C 19/72* (2006.01)
(52) U.S. Cl.
CPC ......... *G01C 19/723* (2013.01); *G01C 19/725* (2013.01)

(58) Field of Classification Search
CPC ... G01C 19/723; G01C 19/725; G02B 6/2843
See application file for complete search history.

(56) References Cited

U.S. PATENT DOCUMENTS 5,037,204 A * 8/1991 Poisel .................. G01C 19/725
356/466

* cited by examiner

*Primary Examiner* — Hwa Andrew Lee (57) ABSTRACT

An improved fiber-optic gyroscope (FOG) is proposed for enhancing the optical measurement sensitivity through the application of a heterodyne effect. The improved FOG is characterized by the use of a dual-injection polarization-maintaining 3×3 directional coupler which is configured to receive a pair of source light beams that are injected thereinto in a bi-directional manner. The forward-injected light beam is used to be split into a pair of interrogating beams for use by a coiled optical fiber to implement the detection and measurement of the Sagnac effect due to a rotational movement. On the other hand, the backward-injected light beam is used to be mixed with the paired interrogating beams that have passed through and returned from the coiled optical fiber to thereby provide a heterodyne effect that can boost the differential optical power amplitude of the paired interrogating beams, thereby enhancing the optical measurement sensitivity of the FOG application.

4 Claims, 6 Drawing Sheets

FIBER-OPTIC GYROSCOPE WITH A DUAL-INJECTION POLARIZATION-MAINTAINING 3X3 DIRECTIONAL COUPLER FOR ENHANCED MEASUREMENT SENSITIVITY THROUGH HETERODYNE

CROSS-REFERENCE TO RELATED APPLICATION

This application is a continuation-in-part of U.S. patent application Ser. No. 17/398,470, filed on Aug. 10, 2021, which is incorporated herewith by reference.

BACKGROUND OF THE INVENTION

1. Field of the Invention

The invention relates to fiber-optic gyroscope (FOG) technology, and more particularly to a fiber-optic gyroscope with a dual-injection polarization-maintaining 3×3 directional coupler that is configured to provide a heterodyne effect for enhancing the optical measurement sensitivity of the FOG application.

2. The Prior Art

Fiber-optic gyroscope (FOG) technology has been utilized in various industrial, defense and automobile sector for the last few decades. It has been proven to be one of the most reliable instruments in navigation and guidance. Although the GPS (global positioning system) technology can also be used to pinpoint a location accurately, typically within an error of less than one meter, one drawback of the GPS technology, however, is that it relies on constant satellite signals as reference such that its use and application is considerably complex and costly to implement. Therefore, there still exists a great demand of redundancy in addition to the GPS system, especially in signaling down time or dead zones. In fact, the only solution currently available for dead-reckoning navigation between the usually sparse well-reckoned points is to use inertial sensors such as fiber gyros and accelerometers.

In conventional FOGs, various kinds of beam-splitting devices such as 2×2 or 3×3 directional couplers have been used for splitting an original source light beam into a pair of interrogating beams which are then injected in a bi-directional manner into a coiled optical fiber for observation and measurement of the so-called Sagnac effect caused by a rotational movement with respect to the surrounding environment. The principle of the Sagnac effect for the FOG application is well-known in the industry, so that description thereof will not be detailed in this specification.

Theoretically, the FOG measurement sensitivity is proportional to the length of the coiled sensing fiber and also dependent on the differential optical power amplitude between the paired interrogating beams that have passed through and returned from the coiled optical fiber. Accordingly, a higher level of the differential optical power amplitude arriving at the detectors would result in a higher level of optical measurement sensitivity and also a higher level of accuracy and robustness in the detected result. However, a direct increase in the optical power of the interrogating beams would also undesirably cause an increase in the noise floor due to photon scattering when the paired interrogating beams counter-propagate through the coiled sensing fiber and also undesirably accumulate to a higher sensor bias drift, thus compromising the sensitivity into an engineering state of the art.

For the reason stated above, it has long been a research effort in the industry to find various feasible ways that can help boost the differential optical power amplitude between the paired interrogating beams for the purpose of enhancing the overall optical measurement sensitivity of the FOG application.

SUMMARY OF THE INVENTION

It is therefore the primary objective of the invention to provide a new and improved FOG that can provide an enhanced higher level of optical measurement sensitivity than the prior art.

The improved FOG designed in accordance with the invention is characterized in that it is implemented with a dual-injection polarization-maintaining 3×3 directional coupler (which is hereinafter referred to in short as DI-PM 3×3 directional coupler) which is configured to receive a pair of source light beams including a first source light beam and a second source light beam, which are injected thereinto in a bi-directional manner.

The forward-injected first source light beam is used to be coupled into a pair of interrogating beams for use by a coiled optical fiber to implement the detection and measurement of the Sagnac effect due to a rotational movement.

On the other hand, the backward-injected second source light beam is used to be mixed with the paired interrogating beams that have passed through and returned from the coiled optical fiber to thereby provide a heterodyne effect for boosting the differential optical power amplitude of the paired interrogating beams. As a result of the application of the heterodyne effect, the optical measurement sensitivity of the FOG application can be enhanced to a significantly higher level than the prior art.

Moreover, since the optical power passing through the sensing fiber coil can be reduced dramatically while the detection sensitivity being augmented by heterodyne, intrinsic flaws that are usually proportional to optical fluence of the interrogating beams of fiber-optic gyroscopes such as the fundamental noise floor of detection due to photon scattering and the bias drift can be effectively mitigated further, thus a crucial niche especially when the sensing fiber requires to be very long.

BRIEF DESCRIPTION OF THE DRAWINGS

The invention can be more fully understood by reading the following detailed description of the preferred embodiments, with reference made to the accompanying drawings, wherein.

DETAILED DESCRIPTION OF THE PREFERRED EMBODIMENT

A new and improved fiber-optic gyro (FOG) designed in accordance with the invention is disclosed and described in details in the following with reference to the accompanying drawings.

Application of FOG of Present Invention

Figure 1:
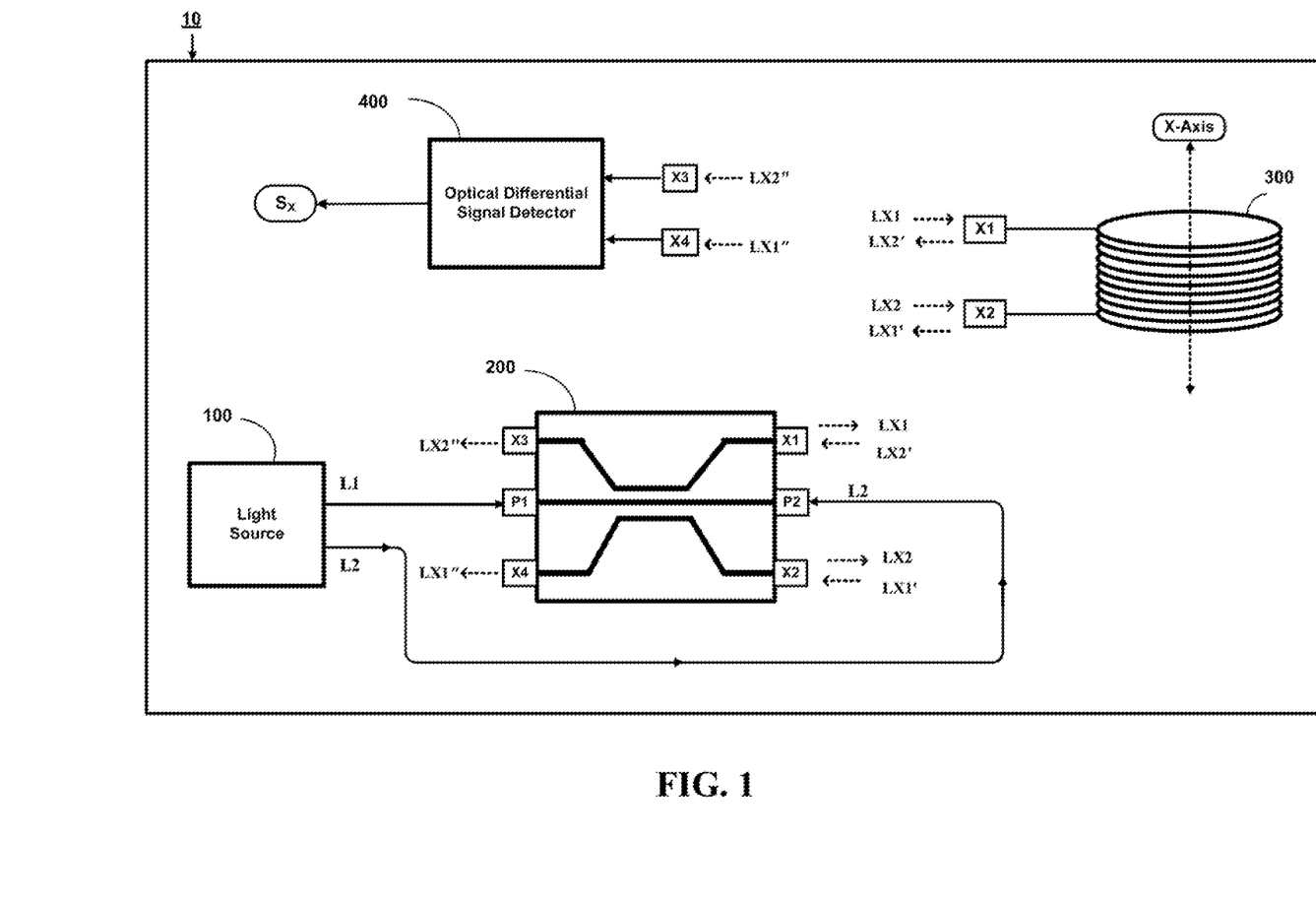
FIG. 1 is a schematic diagram showing the architecture of a new and improved FOG designed in accordance with the invention.

FIG. 1 is a schematic diagram showing the architecture of the new and improved FOG designed in accordance with the invention, which is the part enclosed in the box indicated by the reference numeral 10.

In operation, the FOG 10 of the invention is functionally similar to conventional FOGs, which is likewise used to detect the angle and speed of the rotational movement of a moving object, such as a car or an airplane, with respect to the surrounding environment. However, the FOG 10 of the invention differs from the conventional FOGs particularly in that the FOG 10 of the invention can provide a significantly higher level of optical measurement sensitivity than the conventional FOGs through the application of a heterodyne effect.

Architecture of FOG of Present Invention

As shown in FIG. 1, the FOG 10 of the invention comprises: (a) a light source 100; (b) a dual-injection polarization-maintaining 3×3 directional coupler 200 (which is hereinafter referred to in short as DI-PM 3×3 directional coupler 200); (c) a coiled optical fiber 300; and (d) an optical signal processing unit 400. These constituent elements of the FOG 10 of the invention are respectively described in details with regard to their structures and functions in the following.

Light Source 100

The light source 100 is used for generating and supplying a pair of source light beams of the same frequency $f_c$ (or equivalently the same wavelength) $\lambda_c$, where $\lambda_c$ is equal to the speed of light divided by $f_c$), including a first source light beam L1 and a second source light beam L2, which are both linearly-polarized and originally aligned in phase and oriented in the same polarity with respect to each other before being injected into the BI-PM 3×3 directional coupler 200. The injection again maintains the polarization orientation of both L1 and L2 aligned the same to either the slow or fast axis of the DI-PM 3×3 directional coupler 200.

In practice, the light source 100 can be either implemented with one single light generating device (not shown) for generating one single light beam which is subsequently divided by a beam splitter (not shown) into two beams serving as the paired source light beams (L1, L2), or with the use of two separate light generating devices (not shown) for generating two separate light beams serving as the paired source light beams (L1, L2).

Moreover, the light source 100 is preferably implemented with a light generating device of a low-coherence and small-aperture type, and which can be either a wide-band or a narrow-band type, such as a laser diode, an edge-emitting LED (also called Super-Luminescent Diode), or a fiber ASE (Amplifier Spontaneous Emission) light source, which allows the generated source light beams (L1, L2) to be optically injected into the BI-PM 3×3 directional coupler 200 efficiently with good beam quality.

Both of (L1, L2) are transferred to the DI-PM 3×3 directional coupler 200 and injected thereinto in a bi-directional manner, i.e., L1 is injected forwardly from the front end, while L2 is injected backwardly from the rear end.

Inside the DI-PM 3×3 directional coupler 200, the first source light beam L1 will be coupled symmetrically into two beams of equal power which are used to serve as a pair of interrogating beams (LX1, LX2), while L2 will be used to provide a heterodyne effect to the paired interrogating beams (LX1', LX2') that have passed through and returned from the coiled optical fiber 300. Details about the operation of L1 and L2 within the DI-PM 3×3 directional coupler 200 is described below.

DI-PM 3×3 Directional Coupler 200

Figure 2:
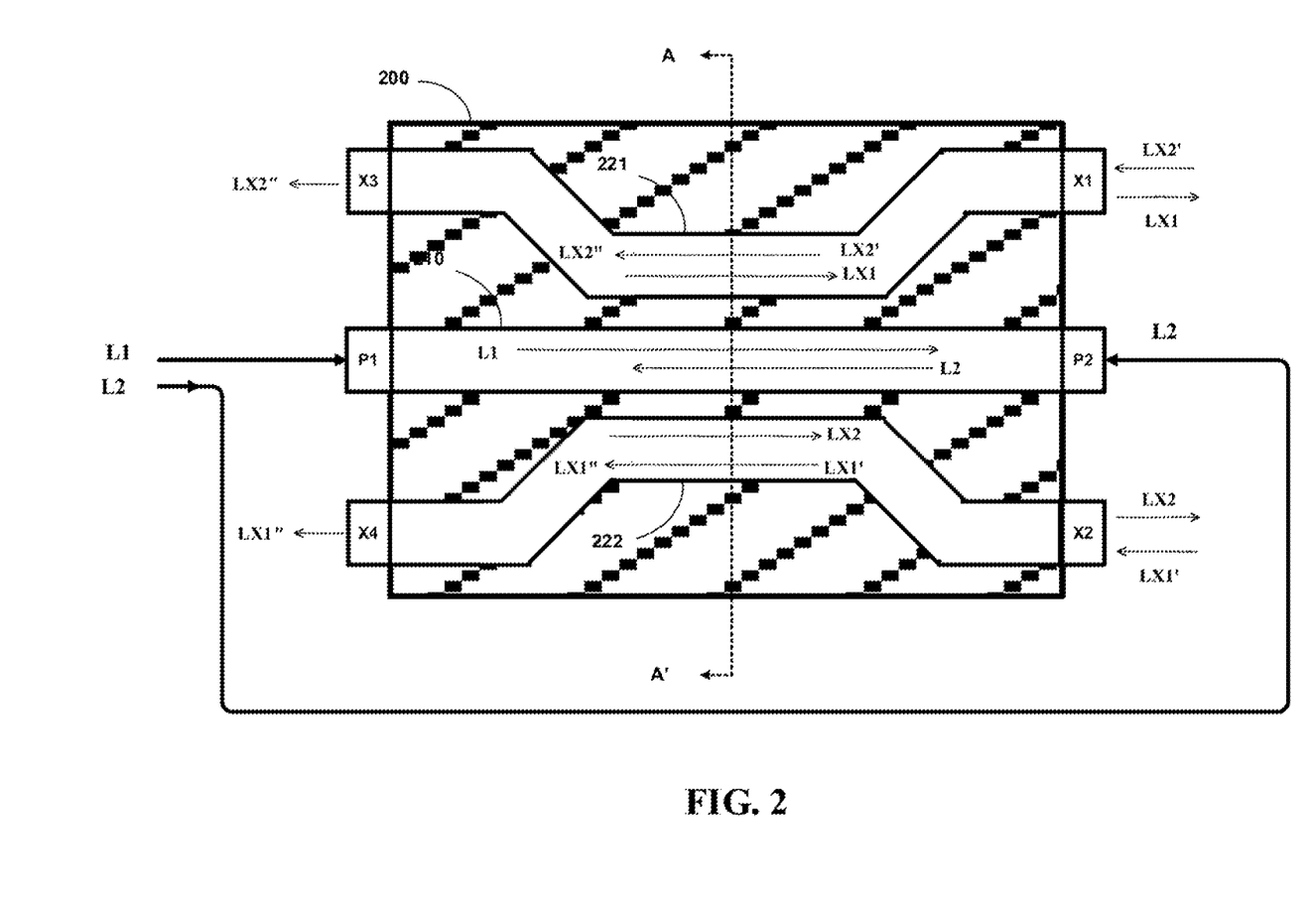
FIG. 2 is a schematic diagram showing the layout of a DI-PM 3×3 directional coupler utilized by the FOG of the invention.

FIG. 2 shows the layout of the DI-PM 3×3 directional coupler 200, which is configured with the six I/O ports: a front port P1, a rear port P2, and four other ports (X1, X2, X3, X4). The DI-PM 3×3 directional coupler 200 comprises a main waveguide 210 and a pair of branching waveguides including a first branching waveguide 221 and a second branching waveguide 222, which are arranged symmetrically in parallel alongside the main waveguide 210.

The main waveguide 210 has two open ends respectively connected to the front port P1 and the rear port P2 of the DI-PM 3×3 directional coupler 200, where P1 is used for receiving the first source light beam L1 from the light source 100, while P2 is used for receiving the second source light beam L2. With this configuration, the two source beams (L1, L2) are injected simultaneously in a bi-directional manner respectively from the front and rear ends into the main waveguide 210.

The paired branching waveguides (221, 222) are arranged symmetrically in parallel alongside the main waveguide 210 such that when L1 is propagating through the main waveguide 210, it will be split into two beams of equal power serving as a pair of interrogating beams (LX1, LX2) which propagate respectively through the paired branching waveguides (221, 222). The power-coupling ratio used to split L1 into (LX1, LX2) can be arbitrarily selected and configured according to actual need.

The DI-PM 3×3 directional coupler 200 used herein is substantially identical in architecture with conventional 3×3 directional couplers, except that in conventional 3×3 directional couplers, the rear end of the main waveguide is either unused or connected to an optical detector for monitoring the power level of the source light beam injected from the front end into the main waveguide, whereas in the DI-PM 3×3 directional coupler 200 used by the present invention, it is characterized in that the rear port P2 is connected to receive a second source light beam L2 for use to provide a heterodyne effect that can help enhance the optical measurement sensitivity of the FOG application. Details about the heterodyne effect will be described later.

The paired ports (X1, X2) are forwardly used to output the paired interrogating beams (LX1, LX2) to the coiled optical fiber 300, and backwardly used to receive the same pair of interrogating beams, denoted instead by (LX1', LX2'), that have passed through and returned from the coiled optical fiber 300.

On the other side, the paired ports (X3, X4) are used to output the same pair of interrogating beams, denoted instead by (LX1", LX2"), that have undergone a heterodyne effect by mixing with the backward-injected second source light beam L2 while passing through the paired branching waveguides (221, 222).

In practice, the main waveguide 210 and the paired branching waveguides (221, 222) are preferably arranged and configured to operate in a polarization-maintaining (PM) mode that allows the split pair of interrogating beams (LX1, LX2) and (LX1', LX2') to constantly maintain the same polarity as the two source light beam (L1, L2) such that when (LX1', LX2') are being mixed with L2, both have the same polarity to provide the optimal heterodyne effect.

Figure 3A:
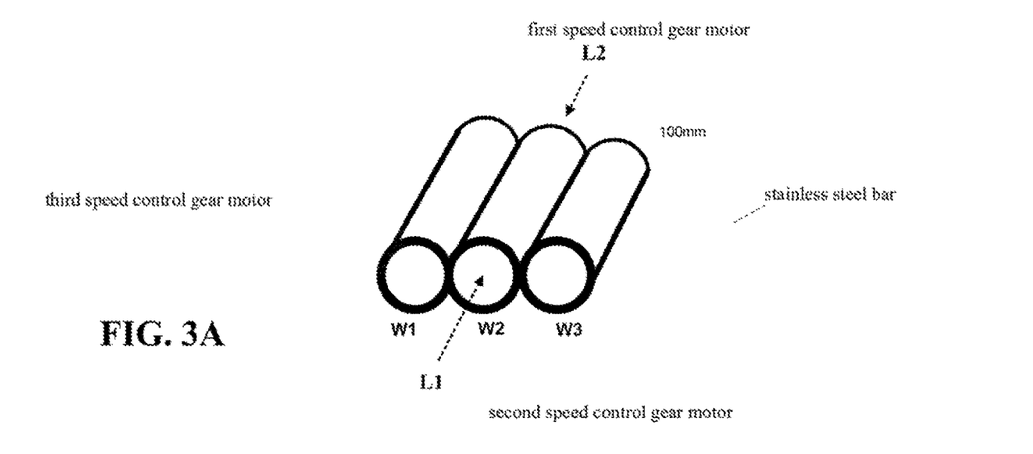
FIG. 3A is a schematic diagram showing a first preferred embodiment of the DI-PM 3×3 directional coupler utilized by the present invention.
Figure 3B:
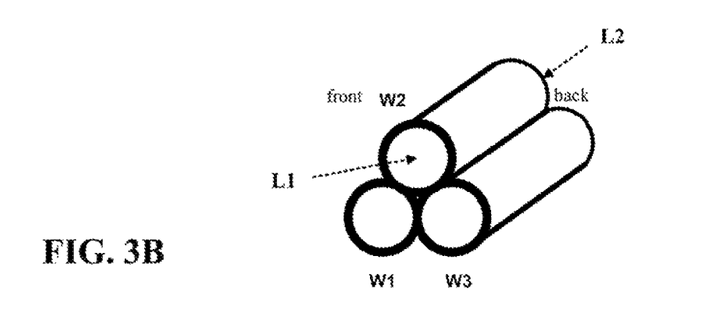
FIG. 3B is a schematic diagram showing a second preferred embodiment of the DI-PM 3×3 directional coupler utilized by the present invention.
Figure 3C:
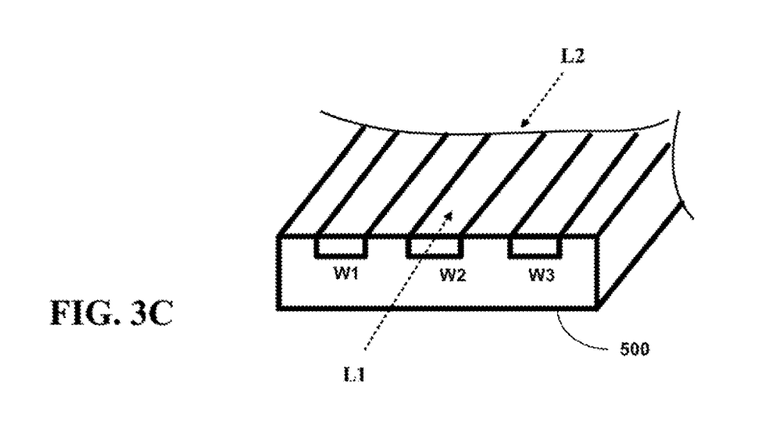
FIG. 3C is a schematic diagram showing a third preferred embodiment of the DI-PM 3×3 directional coupler utilized by the present invention.

FIGS. 3A-3C are schematical diagrams showing three different embodiments of the DI-PM 3×3 directional coupler 200 utilized by the present invention, which are shown in a cross-sectional view cutting through the line A-A' in FIG. 2.

As shown in FIG. 3A, in the first embodiment, the DI-PM 3×3 directional coupler 200 is composed of three optical fibers, respectively denoted by (W1, W2, W3), which are bundled and cross-sectionally arranged in a linear formation wherein W2 is positioned in the center to serve as the main waveguide 210, while (W1, W3) are arranged in parallel alongside W2 to serve as the paired branching waveguides (221, 222). In practice, (W1, W2, W3) are preferably arranged and configured to operate in a polarization-maintaining (PM) mode that allows the split pair of interrogating beams (LX1, LX2) and (LX1', LX2') to constantly maintain the same polarity as the source light beams (L1, L2). In this embodiment, the two source light beams (L1, L2) are injected into W2 in a bi-directional manner simultaneously from the front and rear ends thereof, where L1 is used to generate a pair of interrogating beams (LX1, LX2) which respectively propagate through (W1, W3), while L2 is used to provide a heterodyne effect to the returned pair of interrogating beams (LX1', LX2') propagating in reverse directions through (W1, W3).

As shown in FIG. 3B, in the second embodiment, the DI-PM 3×3 directional coupler 200 is also composed of three optical fibers (W1, W2, W3), which differs from the first embodiment only in that (W1, W2, W3) are bundled and cross-sectionally arranged in a triangular formation wherein W2 is chosen to serve as the main waveguide 210 while (W1, W3) are used to serve as the paired branching waveguides (221, 222). In practice, (W1, W2, W3) are preferably arranged and configured to operate in a polarization-maintaining (PM) mode that allows the split pair of interrogating beams (LX1, LX2) and (LX1', LX2') to constantly maintain the same polarity as the source light beams (L1, L2). In this embodiment, the two source light beams (L1, L2) are injected into W2 in a bi-directional manner simultaneously from both the front and rear ends thereof, where L1 is used to generate a pair of interrogating beams (LX1, LX2) which respectively propagate through (W1, W3), while L2 is used to provide a heterodyne effect to the returned pair of interrogating beams (LX1', LX2') propagating in reverse directions through (W1, W3).

As shown in FIG. 3C, in the third embodiment, the DI-PM 3×3 directional coupler 200 is implemented with a planar photonic integrated circuit 500 on which three wave-guiding structures, denoted respectively by (W1, W2, W3) are formed, wherein W2 is disposed in the center to serve as the main waveguide 210, while (W1, W3) are disposed in parallel alongside W2 to serve as the paired branching waveguides (221, 222). In practical implementation, for example, the coupling between the three wave-guiding structures (W1, W2, W3) in the planar photonic integrated circuit 500 can be either based on evanescent coupling or via shortcut to adiabatic passage. These coupling methods are derived from existing conventional technologies so detailed description thereof will not be given here in this specification. In structure, (W1, W2, W3) can be implemented with any feasible form such as a channel or a ridge type. Moreover, (W1, W2, W3) are preferably arranged and configured to operate in a polarization-maintaining (PM) mode that allows the split pair of interrogating beams (LX1, LX2) and (LX1', LX2') to constantly maintain the same polarity as the source light beams (L1, L2). In this embodiment, the two source light beams (L1, L2) are injected into W2 in a bi-directional manner simultaneously from both the front and rear ends thereof, where L1 is used to generate a pair of interrogating beams (LX1, LX2) which respectively propagate through (W1, W3), while L2 is used to provide a heterodyne effect to the returned pair of interrogating beams (LX1', LX2') propagating in reverse directions through (W1, W3).

Coiled Optical Fiber 300

The coiled optical fiber 300 has two open ends respectively connected to the ports (X1, X2) of the DI-PM 3×3 directional coupler 200 for receiving therefrom the paired interrogating beams (LX1, LX2) which are injected into the coiled optical fiber 300 for observation and measurement of the Sagnac effect due to a mechanical rotational movement about a referenced axis, which is denoted as the X-axis in FIG. 1.

After the paired interrogating beams (LX1, LX2) have passed through and exited from the coiled optical fiber 300, they are instead denoted by (LX1', LX'2), which are subsequently transferred back to the DI-PM 3×3 directional coupler 200, where LX1' is transferred to the port X2, while LX2' is transferred to the port X1. Based on the FOG operation, the returned pair of interrogating beams (LX1', LX2') carry the information about the Sagnac phase caused by a mechanical rotation of the coiled optical fiber 300.

In practice, the coiled optical fiber 300 is preferably implemented with a polarization-maintaining (PM) optical fiber such that the paired interrogating beams (LX1', LX2') will maintain their polarities after exiting from the coiled optical fiber 300. This allows the (LX1', LX2') to maintain the same polarity as the second source light beam L2 when (LX1', LX2') has returned to the DI-PM 3×3 directional coupler 200 to be mixed with L2 to provide a heterodyne effect, thus allowing the heterodyne effect to achieve the optimal result.

Since the principle and operation of the coiled optical fiber 300 for observation and measurement of the Sagnac effect to detect the angle and speed of the rotational movement is the same as conventional FOGs, description thereof will not be detailed here in this specification.

Optical Signal Processing Unit 400

The optical signal processing unit 400 is used to receive and optically sense the paired interrogating beams (LX1", LX2") that are outputted from the paired ports (X3, X4) of the DI-PM 3×3 directional coupler 200, which are resulted from the original paired interrogating beams (LX1, LX2) after they have passed successively through the coiled optical fiber 300 and the DI-PM 3×3 directional coupler 200.

The optical signal processing unit 400 detects and compares the paired interrogating beams (LX1", LX2") to thereby generate a signal $S_X$ that indicates the angle and speed of the rotational movement about the referenced X-axis.

Since the principle and operation of the optical signal processing unit 400 for generating the signal $S_X$ to indicate the angle and speed of the rotational movement is the same as conventional FOGs, description thereof will not be detailed here in this specification.

However, compared to the prior art, it is a characterizing feature of the invention that since the paired interrogating beams (LX1", LX2") are boosted in amplitudes by mixing (LX1', LX2') with the backward-injected second source light beam L2 to provide a heterodyne effect, which results in an increased differential optical power amplitude between the paired interrogating beams (LX1", LX2"), thus allowing a significantly higher level of optical measurement sensitivity than the prior art. Details about the application of the heterodyne effect by the present invention for enhanced measurement sensitivity is described below.

Mathematical Model of FOG of Present Invention

In the following, a mathematical model for the FOG 10 of the invention is formulated to explain how the application of the heterodyne effect by mixing the returned pair of interrogating beams (LX1', LX2') with the backward-injected second source light beam L2 can be used to enhance the measurement sensitivity of the FOG application, For purpose of comparison between the present invention and the prior art, the presentation of the mathematical model is divided into two parts: the first part is directed to an FOG of the prior art with reference to FIGS. 4A-4B, while the second part is directed to the FOG 10 of the present invention with reference to FIGS. 5A-5B.

In comparison, the FOG of the invention differs from the prior art particularly in that in the prior art, only one single source light beam is injected into the 3×3 directional coupler, whereas in the FOG of the present invention, a pair of source light beams (L1, L2) of the same frequency $f_c$ (or the same wavelength $\lambda_c$, where $\lambda_c$ is equal to the speed of light divided by $f_c$) are injected in a bi-directional manner into the 3×3 directional coupler.

(1) Mathematical Model of FOG of Prior Art

Figure 4A:
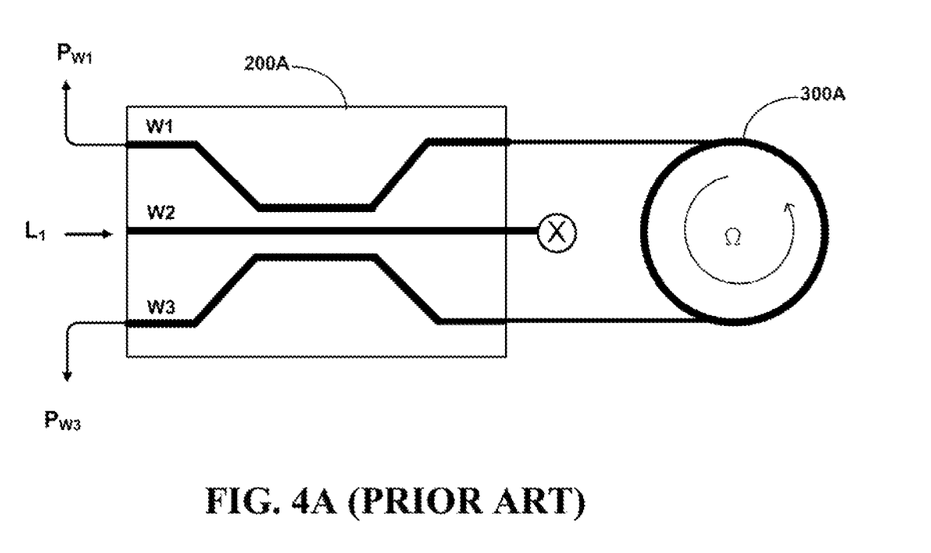
FIG. 4A (PRIOR ART) is a schematic diagram showing the topology of an FOG of the prior art.
Figure 4B:
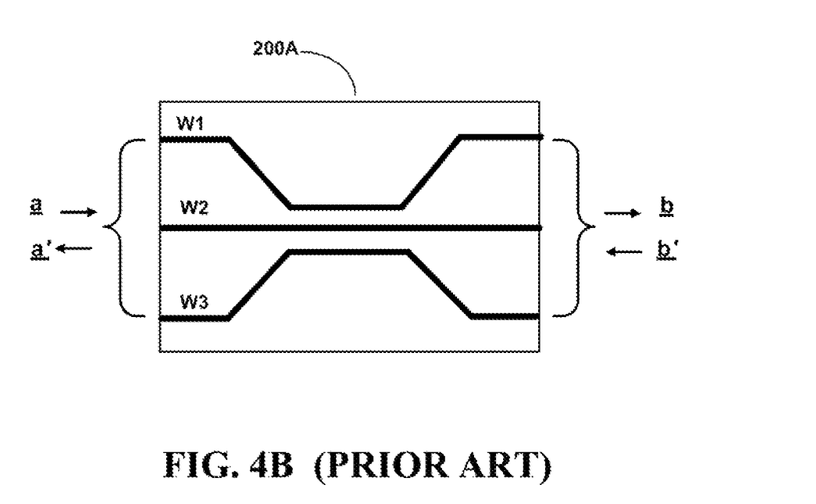
FIG. 4B (PRIOR ART) is a schematic diagram showing the topology of a conventional 3×3 directional coupler utilized by the FOG of the prior art.

FIGS. 4A-4B show the topology of an FOG of the prior art which are used for the formulation of a mathematical model to explain the operation of the FOG of the prior art. As shown in FIG. 4A, the FOG of the prior art comprises a conventional 3×3 directional coupler 200A and a coiled optical fiber 300A. The conventional 3×3 directional coupler 200A includes three waveguides (W1, W2, W3), where W2 serves as a center waveguide, while (W1, W3) serve as a pair of branching waveguides arranged symmetrically in parallel alongside W2. In the FOG of the prior art, the rear end of W2 is unused and unconnected.

In the mathematical model, it is assumed that the source light beam L1 has an amplitude of α as given in Equation (1a). In the 3×3 directional coupler, the cross-coupling coefficient between the center launching port and its adjacent side ports has an amplitude x and θ accounts for the evanescent-coupling induced (ECI) phase shift and is thus referred to as ECI phase angle. When the coiled optical fiber 300A is subjected to a mechanical rotation by an angle of Ω, it will cause a Sagnac phase shift of Ø.

Moreover, as shown in FIG. 4B, in the mathematical model of the conventional 3×3 directional coupler 200A, the following vectors are defined:

α represents a vector of input fields on the left side of (W1, W2, W3)

α' represents a vector of output fields on the left side of (W1, W2, W3)

b represents a vector of output fields on the right side of (W1, W2, W3)

b' represents a vector of input fields on the right side of (W1, W2, W3)

which contains the Sagnac phase information where the underlined quantity denotes a column vector (or henceforth abbreviated as a vector) of field that is propagating forwardly from left to right in FIG. 4B, while the primed vector denotes a vector of field that is propagating backwardly from right to left in FIG. 4B.

Hence, in the 3×3 directional coupler 200A of the prior art (which is absent of the backward-injected second source light beam L2), the input field vector α can be expressed as follows:

$$\alpha = [0,1,0]^T \cdot \alpha_0 \tag{1a}$$

where $\alpha_0$ represents the field amplitude of the source light beam; and $v^T$ represents the transpose of a row vector v into a column vector.

On the other side, the output field vector b can be expressed by a transfer matrix as follows:

$$b = H_x \cdot \alpha$$

where $$Hx = \begin{bmatrix} t_{11} & \kappa_{12} & \kappa_{13} \\ \kappa_{21} & t_{22} & \kappa_{23} \\ \kappa_{31} & \kappa_{32} & t_{33} \end{bmatrix} \cdot \eta_x \tag{1b}$$

and where $t_{11}$ represents the optical field transmission coefficient through W1;

$t_{22}$ represents the optical field transmission coefficient through W2;

$t_{33}$ represents the optical field transmission coefficient through W3;

$k_{mn}$ represents the optical field coupling coefficient from $W_m$ (m=1, 2, 3) to $W_n$ (n=1, 2, 3), m≠;

$\eta_x$ represents the lumped excess loss of the 3×3 directional coupler.

In the above equation, it can be derived that:

$$k_{21} = k_{12} = x \cdot e^{j\theta} \tag{1c-1}$$

$$k_{23} = k_{32} = x \cdot e^{j\theta} \tag{1c-2}$$

$$k_{13} = k_{31} = x^2 \cdot e^{j2\theta} \tag{1d}$$

$$t_{11} = t_{33} = \sqrt{1-x^2} \tag{1e}$$

$$t_{22} = \sqrt{1-2x^2} \tag{1f}$$

Figure 6:
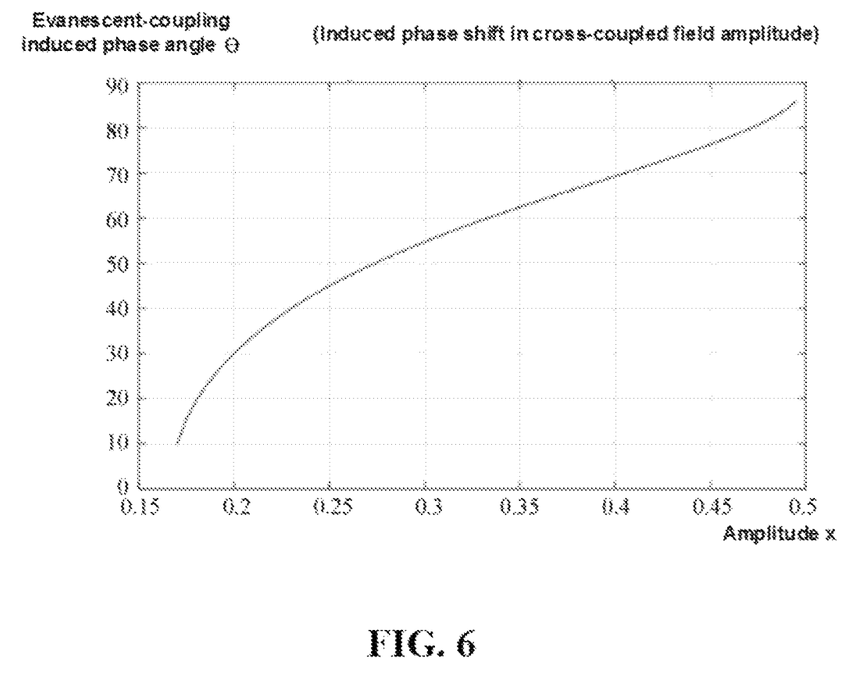
FIG. 6 is a graph used to depict the relation of a scaling factor of Sagnac effect with respect to the amplitude of the original light source.

Referring to FIG. 6, which is a plot of θ versus x, it can be shown that the ECI phase angle θ is dependent on the amplitude x. Moreover, cos(θ) and x both have to be within the magnitude range between 0 and 1, and therefore the following condition is imposed on x:

$$1/6 < x < 1/2 \tag{1g}$$

Further, b' can be expressed as follows:

$$b' = H_c \cdot b$$

where $$Hc = \begin{bmatrix} 0 & 0 & e^{j\emptyset} \\ 0 & 0 & 0 \\ e^{-j\emptyset} & 0 & 0 \end{bmatrix} \cdot \eta_c \quad (2a)$$

in which $\eta_c$ denotes the loss of light beam traversing through the coiled optical fiber 300A.

In the above equation, $\eta_c$ can be determined by the following equation:

$$\eta_c = e^{-\alpha_f L_f} \quad (2b)$$

where $\alpha_f$ denotes the fiber loss coefficient of the coiled optical fiber 300A;

$L_f$ denotes the total length of the coiled optical fiber 300A.

Hence, $\alpha'$ can be determined from $a$ by the conjugate-transpose of a series of transfer matrices as follows:

$$\underline{b} = H_x \cdot \underline{a} = \left[ x \cdot e^{j\theta}, \sqrt{1-2x^2}, x \cdot e^{j\theta} \right]^T \cdot \eta_x \cdot a_0 \quad (3a)$$

$$\underline{b}' = H_c \cdot \underline{b} = \left[ x \cdot e^{j(\theta+\emptyset)}, 0, x \cdot e^{j(\theta-\emptyset)} \right]^T \cdot \eta_x \cdot \eta_c \cdot a_0 \quad (3b)$$

$$\underline{a}' = H'_x \cdot \underline{b}' = H_x^T \cdot \underline{b}' = x \cdot \eta_x^2 \cdot \eta_c \cdot a_0 \cdot \begin{bmatrix} ye^{j\alpha} + x^2 e^{-j\alpha} \\ \text{(ignorne by optical isolation)} \\ x^2 e^{-j\beta} + ye^{j\beta} \end{bmatrix} \quad (3c)$$

$$= [E'_1, E'_2, E'_3]^T \quad (3d)$$

where $$y = \sqrt{1-x^2} \quad (3e)$$

$$\alpha = \theta + \emptyset \quad (3f)$$

$$\beta = \theta - \emptyset \quad (3g)$$

Next, it is assumed that $\alpha_1'$ denotes the output field from the left side of W1, and $\alpha_3'$ denotes the output field from the left side of W3. Then, the output power $P_{w1}$ of W1 is equal to $|\alpha_1'|^2$, and the output power $P_{w3}$ of W3 is equal to $|\alpha_3'|^2$. Therefore, $P_{w1}$ and $P_{w3}$ can be determined as follows:

$$P_{w1} = \alpha_0 \cdot x \cdot \eta_x^2 \cdot \eta_c \cdot |ye^{j\alpha} + x^2 e^{-j\alpha}|^2 = \eta_x^2 \cdot \eta_c \cdot x[x^4 + y^2 + 2yx^{2\cos}(2\alpha)] \quad (4a)$$

$$P_{w3} = \alpha_0 \cdot x \cdot \eta_x^2 \cdot \eta_c \cdot |ye^{j\beta} + x^2 e^{-j\beta}|^2 = \eta_x^2 \cdot \eta_c \cdot x[x^4 + y^2 + 2yx^{2\cos}(2\beta)] \quad (4b)$$

Accordingly, the difference between $P_{w1}$ and $P_{w3}$, which is denoted by $\Delta P$ and referred to as the differential optical power amplitude, can be determined as follows:

$$\Delta P = P_{W3} - P_{W1}$$

$$= 2a_0 \cdot \eta_x^2 \cdot \eta_c \cdot x^3 y \sin(2\theta) \sin(2\psi) \quad (5a)$$

$$= 2a_0 \cdot \eta_x^2 \cdot \eta_c \cdot f(x, \theta) \sin(2\psi) \quad (5b)$$

where $$f(x, \theta) = x^3 y \sin(2\theta) \sim F(x) \quad (6)$$

In the above equation, $f(x,\theta)$ represents and serves as a weighing factor of the differential optical power amplitude. Since the two variables y and $\theta$ are both related to x, as already shown by equation (3e) and FIG. 6, $f(x,\theta)$ can be regarded as a function of the variable x, or $F(x)$.

FIG. 6B is a graph showing a plot of $\Delta P$ versus the power coupling efficient $x^2$ of the conventional 3×3 directional coupler 200A It can be seen that the differential optical power amplitude $\Delta P$ is dependent on the coupler power coupling efficient $x^2$ between the center waveguide W2 and the two branching waveguides (W1, W3) in the conventional 3×3 directional coupler 200A.

(2) Mathematical Model of FOG of Present Invention

Figure 5A:
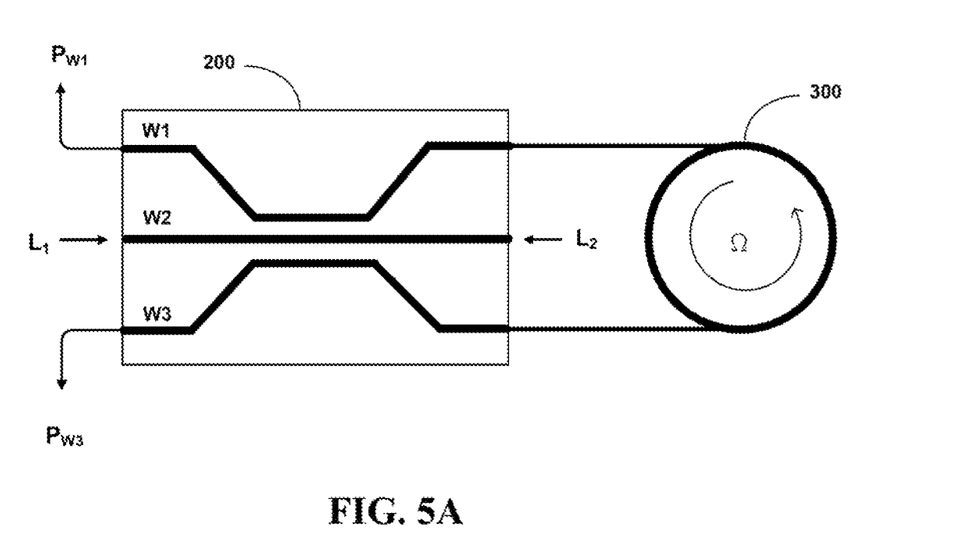
FIG. 5A is a schematic diagram showing the topology of the FOG designed in accordance with the invention.
Figure 5B:
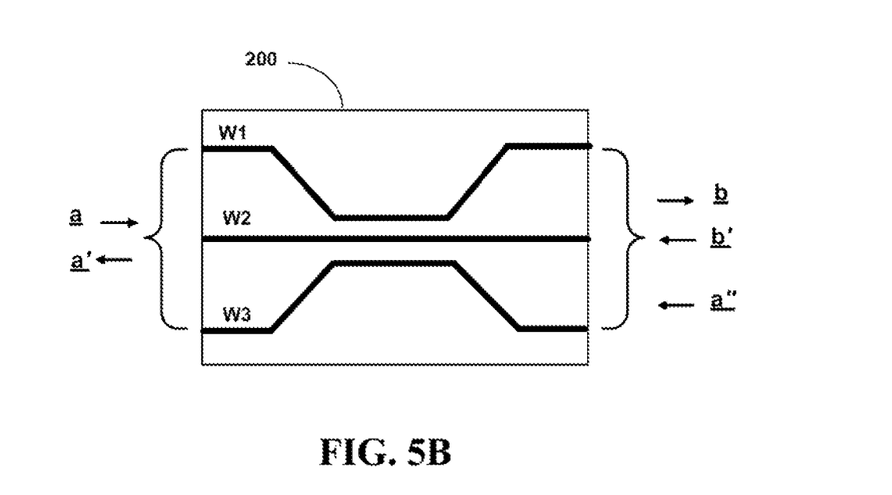
FIG. 5B is a schematic diagram showing the topology of a DI-PM 3×3 directional coupler utilized by the FOG of the invention.

FIGS. 5A-5B show the topology of the FOG of the invention which are used for the formulation of a mathematical model to explain the operation of the FOG of the invention as to how the application of a heterodyne effect by mixing (LX1', LX2') with L2 can enhance the optical measurement sensitivity.

As shown in FIG. 5A, the topology of the FOG of the invention comprises a DI-PM 3×3 directional coupler 200 and a coiled optical fiber 300. The DI-PM 3×3 directional coupler 200 also comprises three waveguides (W1, W2, W3), where W2 is disposed in the center and represents the main waveguide 210, and (W1, W3) represent the paired branching waveguides (221, 222).

Compared to the prior art shown in FIGS. 4A-4B, the DI-PM 3×3 directional coupler 200 used here by the present invention is characterized in that the rear end of W2 is connected to receive a backward-injected second source light beam L2 for mixing with the returned pair of interrogating beams (LX1', LX2') to provide a heterodyne effect.

As shown in FIG. 5B, in the mathematical model of the DI-PM 3×3 directional coupler 200, an additional vector $\alpha''$, which is associated with the backward-injected second source light beam L2, is defined in addition to the four vectors ($\alpha$, $\alpha'$, b, b') as follows:

$\alpha''$: represents a vector of input fields on the right side of (W1, W2, W3) which is associated with the backward-injected second source light beam L2.

In the 3×3 directional coupler 200A used by the prior art shown in FIG. 4B, $\alpha'$ is formulated in Equation (3d) as follows:

$$\underline{a}' = a_0 \cdot x \cdot \eta_x^2 \eta_c \cdot \begin{bmatrix} ye^{j\alpha} + x^2 e^{-j\alpha} \\ \text{(ignorne by optical isolation)} \\ x^2 e^{-j\beta} + ye^{j\beta} \end{bmatrix}$$

$$= [E'_1, E'_2, E'_3]^T$$

In comparison, in the DI-PM 3×3 directional coupler 200 used by the invention shown in FIGS. 5A-5B, when (LX1', LX2') has returned to the DI-PM 3×3 directional coupler 200 to be mixed with L2, since (LX1', LX2') has traveled a longer distance than L2, there is a time delay in (LX1', LX2') that causes a phase shift between L2 and (LX1', LX2'), thus resulting in a time delayed function $\alpha''$ of a.

Therefore, $\alpha'$ is here reformulated as follows:

$$\underline{a}' = a_0 \cdot x \cdot \eta_x^2 \cdot \eta_c \cdot e^{jw_c t} \cdot \begin{bmatrix} ye^{j\alpha} + x^2 e^{-j\alpha} \\ \text{(ignorne by optical isolation)} \\ x^2 e^{-j\beta} + ye^{j\beta} \end{bmatrix} \quad (6a)$$

where $w_c$ is equal to $2\pi \cdot fc$, where fc is the modulation carrier frequency of L1 and L2;

t represents a variable of time.

Hence, α″ is reformulated as follows:

$$\underline{a}'' = a_0 \cdot \eta_b \cdot e^{jw_c(t-\delta)} \cdot \begin{bmatrix} \kappa_{31} \\ t_{22} \\ \kappa_{23} \end{bmatrix} \quad (6b)$$

where
δ represent a time delay between L2 and L1 at the time when L2 is mixing with (LX1′, LX2′), or equivalently a phase shift in L2 with respect to L1; and
$\eta_b$ represents the optical power ratio of L2 versus L1 detected at the time when (L1, L2) reach the output ports (X3, X4) of the DI-PM 3×3 directional coupler 200 used by the invention shown in FIG. 1.

Accordingly, the mixing of L2 with (LX1′, LX2′) can be formulated as follows:

$$\underline{a}\_\_\_\_\_\_' + \underline{a}'' = \begin{bmatrix} E_1' \\ E_2' \\ E_3' \end{bmatrix} \quad (6c)$$

where $$E_1' = \alpha_0 \cdot \eta_x^2 \cdot \eta_c \cdot x \cdot (y e^{j\alpha} + x^2 e^{-j\alpha}) \cdot e^{jw_c t} + \alpha_0 \cdot \eta_b \cdot k_{21} \cdot e^{jw_c(t-\delta)} \quad (6d)$$

$$E_3' = \alpha_0 \cdot \eta_x^2 \cdot \eta_c \cdot x \cdot (y e^{j\beta} + x^2 e^{-j\beta}) \cdot e^{jw_c t} + \alpha_0 \cdot \eta_b \cdot k_{21} \cdot e^{jw_c(t-\delta)} \quad (6e)$$

and where
$E_2'$ represents a signal component that can be ignored, which will be suppressed and rejected while passing through an optical isolator (not shown) that is coupled before the output of L1.

Next, letting $P_{w1}'$ denote the optical power of LX1″ outputted from the left side of W1, and $P_{w3}'$ denote the optical power of LX2″ outputted from the left side of W3, then $P_{w1}'$ and $P_{w3}'$ can be formulated as follows:

$$P_{W1}' = |E_1'|^2 \quad (7a)$$
$$= P10 + (a_0 \cdot \eta_b \cdot \kappa_{21})^2 + 2a_0^2 \cdot \eta_b \cdot \eta_c \cdot \eta_x^2 \cdot$$
$$(y e^{j\alpha} + x^2 e^{-j\alpha}) \cdot \cos(w_c \cdot \delta) + Z1$$

$$P_{W3}' = |E_3'|^2 \quad (7b)$$
$$= P30 + (a_0 \cdot \eta_b \cdot \kappa_{23})^2 + 2a_0^2 \cdot \eta_b \cdot \eta_c \cdot \eta_x^2 \cdot$$
$$(y e^{j\alpha} + x^2 e^{-j\alpha}) \cdot \cos(w_c \cdot \delta) + Z3$$

where
P10 represents the power measured at W1 in backward direction when without the backward-injection of L2;
P30 represents the power measured at W3 in backward direction when without the backward-injection of L2; and
Z1 and Z3 each represent a higher frequency component that will be subsequently rejected through a routine use of a low pass filter (LFP) in the heterodyne detection.

Hence, letting ΔP′ represent the differential optical power amplitude between $P_{w1}'$ and $P_{w3}'$, ΔP′ can be derived as follows:

$$\Delta P' = P_{W3}' - P_{W1}' \quad (7c)$$
$$= 2a_0 \cdot \eta_x^2 \cdot \eta_c F(x) \cdot [1 + a_0 \cdot \eta_b \cdot \cos(w_c \cdot \delta)] \cdot \sin(2\phi)$$

$$= 2a_0 \cdot \eta_x^2 \cdot \eta_c F(x) \cdot [1 + M] \cdot \sin(2\phi)$$

where $$M = a_0 \cdot \eta_b \cdot \cos(w_c \cdot \delta)$$

Comparing the above Equation (7c) with (5b), it can be seen that in accordance with the invention, the mixing of (LX1′, LX2′) with L2 to obtain (LX1″, LX2″) through a heterodyne effect allows the differential optical power amplitude ΔP′ between the amplitudes of (LX1″, LX2″) to be significantly increased by a factor of (1+M). As a result, the FOG of the invention is able to provide a significantly higher level of optical measurement sensitivity than the prior art.

Further, in the equation of the gain factor (1+M), M is correlated with and dependent on two parameters (δ, $\eta_b$), where δ is the phase shift between L2 and L1 due to a time delay between L2 and L1 at the time when L2 is being mixed with (LX1′, LX2′) and rib is a scaling factor of the power ratio of L2 versus L1 detected at the time when (L1, L2) reach the output ports (X3, X4) of the DI-PM 3×3 directional coupler 200 used by the invention. In accordance with the preferred embodiment of the invention, L1 and L2 are synchronized such that the value of $\cos(w_c \cdot \delta)$ is a constant and close to 1. For the other parameter $\eta_b$, since the backward-injected second source light beam L2 doesn't have to propagate all the way through the entire length of the coiled optical fiber 300 during the course of the heterodyne effect, rib can be tailored to be substantially larger than 1. In this way, the gain factor (1+M) can be tailored to the maximum possible value by judiciously choosing a minimum possible value for δ and a maximum possible value for $\eta_b$.

Operation of FOG of Present Invention

The following is a description of the overall operation of the FOG 10 designed in accordance with the invention.

As shown in FIG. 1, when the FOG 10 is activated, the light source 100 will emit a pair of light beams of the same frequency, including a first source light beam L1 and a second source light beam L2, which are then transferred respectively to the front port P1 and rear port P2 of the DI-PM 3×3 directional coupler 200. As a result, (L1, L2) are injected into the 3×3 directional coupler 200 in a bi-directional manner.

For the first source light beam L1, after it enters the DI-PM 3×3 directional coupler 200, it will propagate through the main waveguide 210 and split symmetrically into two beams of equal power serving as a pair of interrogating beams (LX1, LX2) which propagate respectively through the paired branching waveguides (221, 222). The paired interrogating beams (LX1, LX2) are subsequently transferred via the ports (X1, X2) to the coiled optical fiber 300 for use in the observation and measurement of the Sagnac effect due to a mechanical rotation about the referenced X-axis. After having passed through and exited from the coiled optical fiber 300, the paired interrogating beams (LX1, LX2) are instead denoted by (LX1′, LX2).

The paired interrogating beams (LX1′, LX2′) that have exited from the coiled optical fiber 300 are then transferred back to the DI-PM 3×3 directional coupler 200, where LX1′ is transferred to the port X2 such that it subsequently propagates through the second branching waveguide 222, while LX2' is transferred to the port X1 such that it subsequently propagates through the first branching waveguide 221.

When (LX1', LX2') are passing through the paired branching waveguide (221, 222), they are mixed with the backward-injected second source light beam L2 which is injected into the main waveguide 210 from the rear port P2, thus resulting in a heterodyne effect that boosts the differential optical power amplitude of the paired interrogating beams (LX1', LX2'). After undergoing the heterodyne effect, the paired interrogating beams (LX1', LX2') are instead denoted by (LX1", LX2"), which are then outputted from the ports (X3, X4) and transferred to the optical signal processing unit 400.

At the optical signal processing unit 400, (LX1", LX2") are optically sensed to detect their phase difference to thereby generate an output signal $S_X$ which indicates the angle and speed of the rotational movement about the referenced X-axis.

In the foregoing operation, it is a characterizing feature of the invention that due to the application of the heterodyne effect, (LX1", LX2") are boosted in amplitudes to provide a higher level of differential optical power amplitude ΔP' that is higher than the prior art by a gain factor of (1+M) as expressed in Equation (7c). Accordingly, it can be concluded that the FOG 10 of the invention is able to provide a significantly enhanced level of optical measurement sensitivity than the prior art.

Moreover, in the FOG 10 of the present invention, since the source light beams (L1, L2) are linearly-polarized while the DI-PM 3×3 directional coupler 200 as well as the coiled optical fiber 300 are all arranged and configured to operate in a polarization-maintaining (PM) mode, the split pair of interrogating beams (LX1, LX2) and the returned pair of interrogating beams (LX1', LX2') can constantly maintain the same polarity as (L1, L2). As a result, when L2 is being mixed with (LX1', LX2') in the DI-PM 3×3 directional coupler 200 to provide a heterodyne effect, both have the same polarity to allow the heterodyne effect to achieve the optimal result.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A fiber-optic gyroscope, comprising:
   (a) a light source for generating a pair of source light beams of the same frequency, including a first source light beam and a second source light beam, which are both linearly-polarized and originally aligned in phase and oriented in same polarity with respect to each other;
   (b) a dual-injection polarization-maintaining 3×3 directional coupler comprising:
      a main waveguide having a front port for receiving the first source light beam and a rear port for simultaneously receiving the second source light beam; and
      a pair of branching waveguides arranged in parallel alongside the main waveguide;
      wherein the first source light beam propagating through the main waveguide is split into a pair of interrogating beams which propagate respectively through the paired branching waveguides; and
      wherein the main waveguide and the paired branching waveguides are arranged and configured to operate in a polarization-maintaining mode that allows the split pair of interrogating beams to maintain the same polarity as the first source light beam and the second source light beam;
   (c) a coiled optical fiber of a polarization-maintaining type, which is arranged and configured to receive the paired interrogating beams from the dual-injection polarization-maintaining 3×3 directional coupler for observation and measurement of Sagnac effect due to a rotational movement about a referenced axis, where the paired interrogating beams after exiting from the coiled optical fiber are transferred back to the dual-injection polarization-maintaining 3×3 directional coupler; and
   (d) an optical signal processing unit for receiving and optically sensing the paired interrogating beams that have passed through the coiled optical fiber and the dual-injection polarization-maintaining 3×3 directional coupler to thereby generate an output signal that indicates the angle and speed of the rotational movement about the referenced axis;
   wherein
   the second source light beam is injected into the rear port of the main waveguide such that the second source light beam is mixed with the paired interrogating beams that have passed through and returned from the coiled optical fiber and are passing through the paired branching waveguides to thereby provide a heterodyne effect for boosting the differential optical power amplitude of the paired interrogating beams to achieve enhanced optical measurement sensitivity.

2. The fiber-optic gyroscope as recited in claim 1, wherein the dual-injection polarization-maintaining 3×3 directional coupler is implemented with three optical fibers which are bundled and cross-sectionally arranged in a linear formation.

3. The fiber-optic gyroscope as recited in claim 1, wherein the dual-injection polarization-maintaining 3×3 directional coupler is implemented with three optical fibers which are bundled and cross-sectionally arranged in a triangular formation.

4. The fiber-optic gyroscope as recited in claim 1, wherein the dual-injection polarization-maintaining 3×3 directional coupler is implemented with a planar photonic integrated circuit on which three waveguiding structures are formed and arranged cross-sectionally in a linear formation, wherein the center-positioned one of the three waveguiding structures serves as the main waveguide with the other two serving as the paired branching waveguides.

* * * * *